July 14, 1964

J. W. QUYNN 3,140,585

HYDROKINETIC COUPLING FOR A DIFFERENTIAL
FLUID DRIVE FOR VEHICLES

Filed Dec. 1, 1961

INVENTOR.
JOHN W. QUYNN
BY Kimmel & Crowell
ATTORNEYS.

INVENTOR.
JOHN W. QUYNN
BY
Kimmel & Crowell
ATTORNEYS.

3,140,585
HYDROKINETIC COUPLING FOR A DIFFERENTIAL FLUID DRIVE FOR VEHICLES
John W. Quynn, 220 E. Patrick St., Frederick, Md.
Filed Dec. 1, 1961, Ser. No. 156,214
4 Claims. (Cl. 60—54)

This invention relates to a hydrokinetic coupling for a differential fluid drive for vehicles, and has as its primary object the provision of a fluid drive housing containing a freely rotating bladed rotor and a pair of bladed rotors on opposite sides of the free rotor, with the last-mentioned rotor being geared to the drive axle.

An additional object of the invention is the provision of a rotary fluid drive of this character which permits a great flexibility of drive both under high and low pressure operating conditions, and wherein power is transmitted to the driven axle solely through the fluid, the assembly being characterized by the absence of fixed connections between the center rotor which is fluid driven and the outer rotors which are driven by the fluid from the center rotor.

A further object of the invention is the provision of a fluid drive of this character which may be readily applied to existing vehicles, or which may be factory installed, and which takes the place of the present geared differential assembly as well as eliminating other components of present day motor vehicles.

Still other objects reside in the combinations of elements, arrangements of parts, and features of construction, all as will be more fully pointed out hereinafter and shown in the accompanying drawings wherein.

Similar reference characters refer to similar parts throughout the several views of the drawing.

Figure 1:
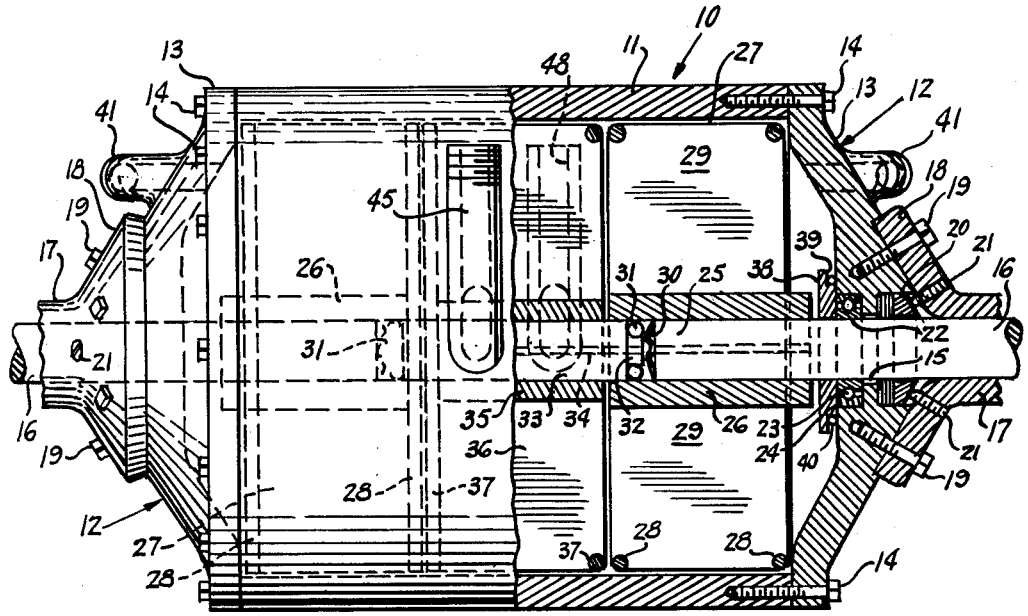
FIGURE 1 is a side view, partially in elevation, and partially in section, of one form of rotor embodying the instant inventive concept.
Figure 2:
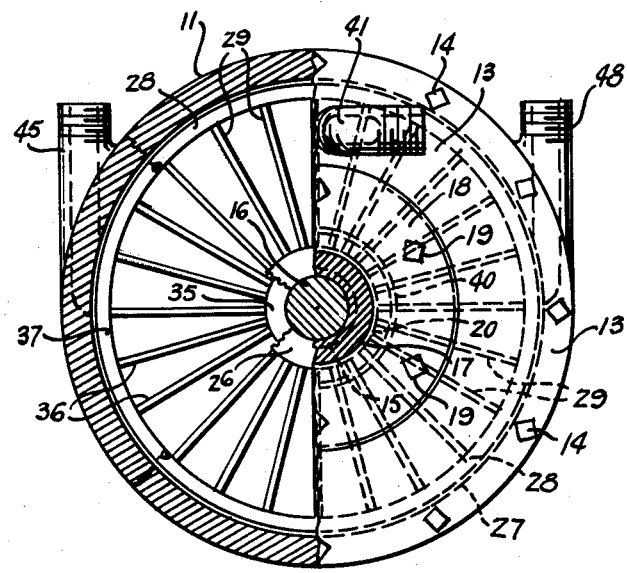
FIGURE 2 is an end view partially in elevation and partially in section of the rotary drive mechanism of FIG. 1.
Figure 3:
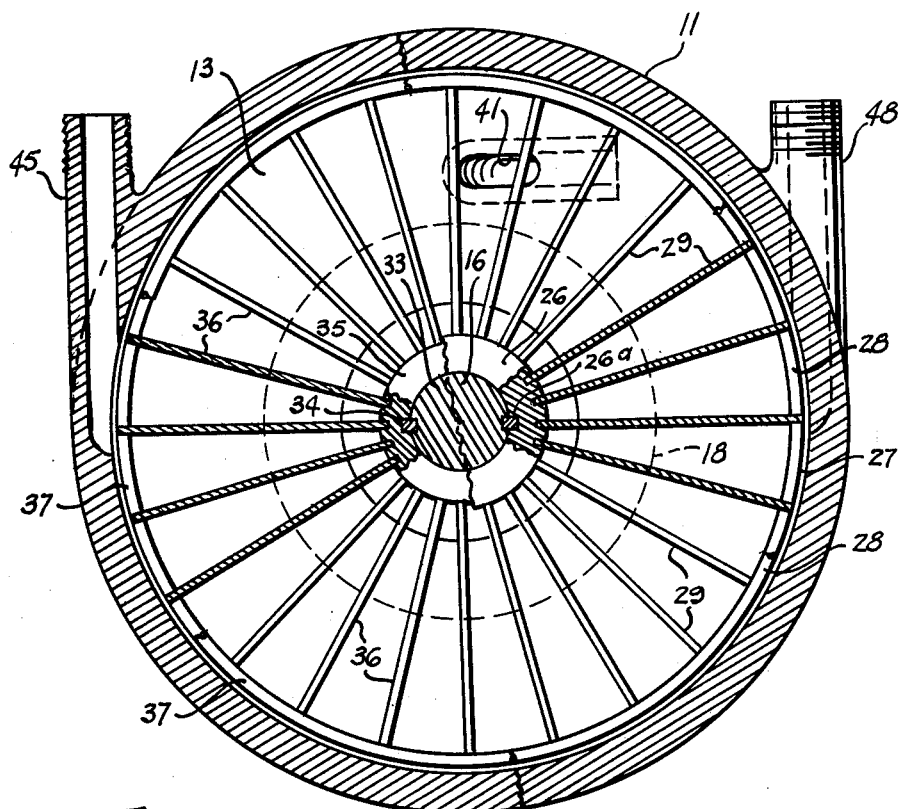
FIGURE 3 is an enlarged central sectional view, partially broken away, showing sections of both the drive rotor and the driven rotor.

Having reference now to the drawings in detail, the hydraulic drive mechanism of the instant invention is generally indicated at 10 and comprises a cylindrical central housing 11 provided at its opposite ends with substantially identical end plates generally indicated at 12. The end plates include an annular flange 13 which is secured as by bolts 14 to the cylindrical casing 11, and are provided with a central aperture 15 through which extends a drive axle 16. Axle 16 is adapted to be connected directly to the rear wheels of a vehicle (not shown).

An axle housing 17 surrounds the axle 16 and has an angularly disposed peripheral flange 18 thereon which is bolted as by means of bolts 19 to the end plate 13. A packing ring 20 surrounds the axle 16 adjacent the end of the axle housing 17 and is secured in position by packing ring screws 21. An inner bearing race 22 is fixed to the axle 16 and operates in conjunction with bearings 23 and an outer bearing race 24. The end of axle 16 extends as indicated at 25 into the tubular hub 26 of a rotor 27, there being one rotor 27 positioned adjacent each end plate or header 13 of the casing. Peripheral circumferential reinforcing rings 28 are provided around the individual blades 29 of each rotor 27.

The end of axle 16 carries a spring washer 30 which engages bearings 31 which surround a stud 32 positioned on the extremity of a driving rotor axle 33. The driving rotor axle 33 is keyed as by means of a key 34 to a driving rotor hub 35 which carries a plurality of blades 36, annular reinforcing rings 37 also being provided about the periphery of the driving rotor.

A sealing disk 38 provided with an annular groove 39 containing an O-ring 40 is positioned about each axle 16 immediately adjacent the inner surface of header 13.

Figure 4:
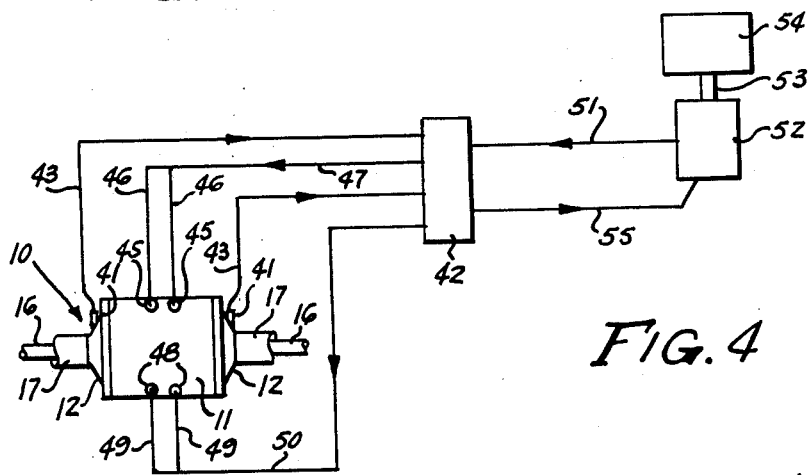
FIGURE 4 is a schematic flow diagram showing the positioning of an operation of the hydraulic drive of the instant invention.

Each end plate 12 is provided with an offset fluid outlet 41, permitting return of fluid, as best shown in FIG. 4 to a valve manifold 42 through return lines 43.

Dual tangential forward fluid inlets 45 are provided on one side of the casing and are connected by means of lines 46 to a common line 47 through which fluid from valve manifold 42 is passed under pressure to rotate the blades 36. Similarly positioned, dual reverse inlets 48 are provided on the opposite side of the casing for reverse rotation of the driving blades 36, and are connected through dual lines 49 to a reverse line 50 which also extends from the valve manifold 42. A fluid power line 51 extends from a suitable conventional pump 52 which is powered through a shaft 53 from the engine 54 of the vehicle. A return line 55 extends from the valve manifold 42 back to the pump 52.

From the foregoing the use and operation of the device should now be readily understandable.

Fluid is forced by the pump 52 through the line 51 of the valve manifold 42 from which is directed when forward movement is desired through the line 47 to the inlets 45 impinging on the blades 36 at a relatively high velocity. Since the axle 33 is keyed by means of key 34 to the driving rotor hub 36, free rotation of the blades 37 is assured.

The fluid driven by blades 37 impinges upon blades 29 which in turn through hub 26 and key 26a drive the driven axle 16.

When reverse motion is desired the valve manifold is suiatbly actuated from any convenient location near the driver's seat to cut off the line 47 and pass fluid through the lines 50 and 49 to the reverse inlets 48, these inlets being similarly tangentially located relative to the radius of the blades, and the free rotor comprised of the blades 37 and their associated hub, driving rotor hub 35 and free axle 33. The reverse rotation of the driving fluid thus occasioned is impinged on the blades 29 which through their connection by a hub 26 and key 26a with the driven axle 16 cause these axles and their associated mechanism to rotate in a reverse direction.

While there has herein been described a fluid drive mechanism particularly adapted for use with motor vehicles or the like, it is to be understood that the principle involved may be applied to any rotating shaft or shafts to which it is desired to impart forward and reverse movement. Similarly, by suitable rearrangement of the parts, the center rotor may be keyed to a shaft to form a driven rotor and the two outer rotors may be mounted on the shaft for rotation and act as drive rotors.

It is to be understood that blades 29 can be operated for light work without free running blade 36 for light loads where the free rotating driving rotor does not need an axle bearing, as it is a cage running in oil, for use in fan ventilating mine systems and similar installations not requiring heavy starting torque.

It is also understood that mercury may be regarded as a drive fluid within the scope of the instant invention.

From the foregoing it will now be seen that there is herein provided an improved fluid drive mechanism which accomplishes all the objects of this invention, and others, including many advantages of great practical utility and commercial importance.

As many embodiments may be made of this inventive concept, and as many modifications may be made in the embodiment hereinbefore shown and described, it is to be

I claim:

1. In a fluid drive mechanism, the combination of a cylindrical casing, an end plate having a central opening therein closing each end of said casing, a driven axle extending through each opening into said casing, a free running drive axle positioned in alignment with and between said driven axles, and mounted in the ends of said driven axles and rotatable independently thereof, a drive rotor comprised of a plurality of blades fixed to said drive axle wholly contained within said casing and having no external connections, a driven rotor composed of a plurality of blades affixed to each driven axle, a tangential fluid inlet in said casing adjacent said drive rotor, and a fluid outlet in each end plate whereby the sole driving connection between said drive axle and said driven axle comprises the fluid transmitted by the blades of said drive rotor to the blades of said driven rotors.

2. In a fluid drive mechanism, the combination of a cylindrical casing, an end plate having a central opening therein closing each end of said casing, a driven axle extending through each opening into said casing, a free running drive axle positioned in alignment with and between said driven axles, and mounted in the ends of said driven axles and rotatable independently thereof, a drive rotor comprised of a plurality of blades fixed to said drive axle wholly contained within said casing and having no external connections, a driven rotor composed of a plurality of blades affixed to each driven axle, a tangential fluid inlet in said casing adjacent said drive rotor, and a fluid outlet in each end plate whereby the sole driving connection between said drive axle and said driven axle comprises the fluid transmitted by the blades of said drive rotor to the blades of said driven rotors, an oppositely disposed tangential fluid inlet in said casing on the opposite side thereof to impart reverse rotation to said drive rotor and means for selectively introducing driving fluid under pressure into one or the other of said inlets.

3. The structure of claim 2 wherein bearings and a spring washer are interposed between each end of the drive axle and the adjacent end of the driven axle.

4. The structure of claim 3 wherein the hydraulic fluid is mercury.

References Cited in the file of this patent

UNITED STATES PATENTS

| 2,417,224 | Weatherhead | Mar. 11, 1947 |
| 2,536,564 | Novak | Jan. 2, 1951 |

FOREIGN PATENTS

| 442,389 | Germany | Mar. 30, 1927 |
| 769,893 | Great Britain | Mar. 13, 1957 |